United States Patent
Mack

(10) Patent No.: US 6,943,676 B2
(45) Date of Patent: Sep. 13, 2005

(54) CLUTCH PROTECTION SYSTEM

(75) Inventor: William J. Mack, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 61 days.

(21) Appl. No.: 10/261,741

(22) Filed: Oct. 1, 2002

(65) Prior Publication Data

US 2004/0061603 A1 Apr. 1, 2004

(51) Int. Cl.[7] .............................................. B60Q 1/00
(52) U.S. Cl. ...................... 340/453; 340/454; 340/456; 340/679; 477/76; 477/98; 477/125
(58) Field of Search ................. 340/453, 454, 340/456, 679; 180/197, 278; 477/76, 98, 116, 125, 39, 62, 64, 174; 701/34, 54, 62, 65

(56) References Cited

U.S. PATENT DOCUMENTS

| | | | |
|---|---|---|---|
| 4,295,551 A | | 10/1981 | Zimmermann et al. |
| 4,502,579 A | | 3/1985 | Makita |
| 4,651,142 A | * | 3/1987 | Klatt ........................... 340/453 |
| 4,722,426 A | * | 2/1988 | Bellanger .................... 477/175 |
| 5,337,866 A | * | 8/1994 | Stürmer et al. .............. 477/175 |
| 5,982,280 A | * | 11/1999 | Fahrbach et al. ........... 340/453 |
| 6,040,768 A | * | 3/2000 | Drexl .......................... 340/453 |
| 6,095,946 A | | 8/2000 | Maguire et al. |

FOREIGN PATENT DOCUMENTS

| | | |
|---|---|---|
| DE | 100 32 906 A1 | 3/2001 |
| EP | 0 482 691 A1 | 4/1992 |
| EP | 0 493 840 A2 | 7/1992 |
| EP | 1 225 362 A2 | 7/2002 |
| GB | 2 327 248 A | 1/1999 |
| WO | WO 01/72546 A1 | 10/2001 |
| WO | WO02/25133 A1 | 3/2002 |

OTHER PUBLICATIONS

International Search Report (3 pages—WO 02 25133 not included with this IDS due to the fact that it was previously provided).
Derwent English Abstract for DE 100 32 906 A1.
Delphion English Abstract for EP 0 493 840 A2.

* cited by examiner

*Primary Examiner*—Hung Nguyen
(74) *Attorney, Agent, or Firm*—Rader, Fishman & Grauer PLLC

(57) ABSTRACT

A system for protecting the clutch of a vehicle from a harmful operating state. Included in the clutch protection system are means for monitoring the operating state of the clutch, along with means for estimating the amount of energy being dissipated by the clutch. A control unit compares the estimated amount of energy dissipated by the clutch to one or more predetermined threshold energy levels. One or more actions designed to reduce the amount of energy dissipated by the clutch are initiated when the estimated amount of energy dissipated by the clutch exceeds the one or more predetermined thresholds.

28 Claims, 5 Drawing Sheets

CLUTCH PROTECTION SYSTEM

FIELD OF THE INVENTION

The present invention relates to a clutch of a vehicle, and, more specifically, a system and method for protecting the clutch from excessive wear and potential damage.

BACKGROUND OF THE INVENTION

A clutch is a mechanism designed to connect or disconnect power from one working part to another. In terms of vehicles, the clutch is used to transmit power from the motor to the drive train, and to disengage the motor and transmission when shifting gears.

In its simplest form, the clutch can be considered as comprising two plates that can be selectively placed up against one another. One plate (flywheel) is attached to and rotated by a motor. A counterpart plate (clutch plate) attaches to a system of gears that one wants to run with the power of the motor. To transfer the power of the motor to the gears, the clutch plate is pushed up against the rotating flywheel. Upon being pressed up against one another, the two plates don't initially spin in synch. Instead, the driving plate (flywheel) rotates at a faster rate than the receiving plate (clutch plate) as the receiving plate slips against the driving plate as it rotates. This spinning of the two plates at different speeds is what results in wear and damage to the clutch. However, if the two plates become fully engaged, or locked together, frictional forces are strong enough to cause the two plates to spin at the same speed and no wear occurs.

During the runnning of a vehicle, there are several operating states where the clutch is neither fully engaged or disengaged. Instead, the clutch "slips" excessively, resulting in premature wear and damage to the clutch. In response, the Applicant has developed a clutch protector system that detects and resolves these operating states, thereby reducing the amount of wear or damage subjected upon the clutch.

SUMMARY OF THE INVENTION

The present invention relates to a vehicle clutch protection system, comprising a monitor for monitoring an operating state of a clutch, an estimator for estimating an amount of energy dissipated by the clutch, and a comparator that compares the estimated amount of dissipated clutch energy to at least one predetermined threshold energy levels. If the estimated amount of dissipated clutch energy exceeds a predetermined threshold energy level, a control unit initiates one or more actions to reduce the amount of energy dissipated by the clutch.

DESCRIPTION OF THE PREFERRED EMBODIMENT

Figure 1:
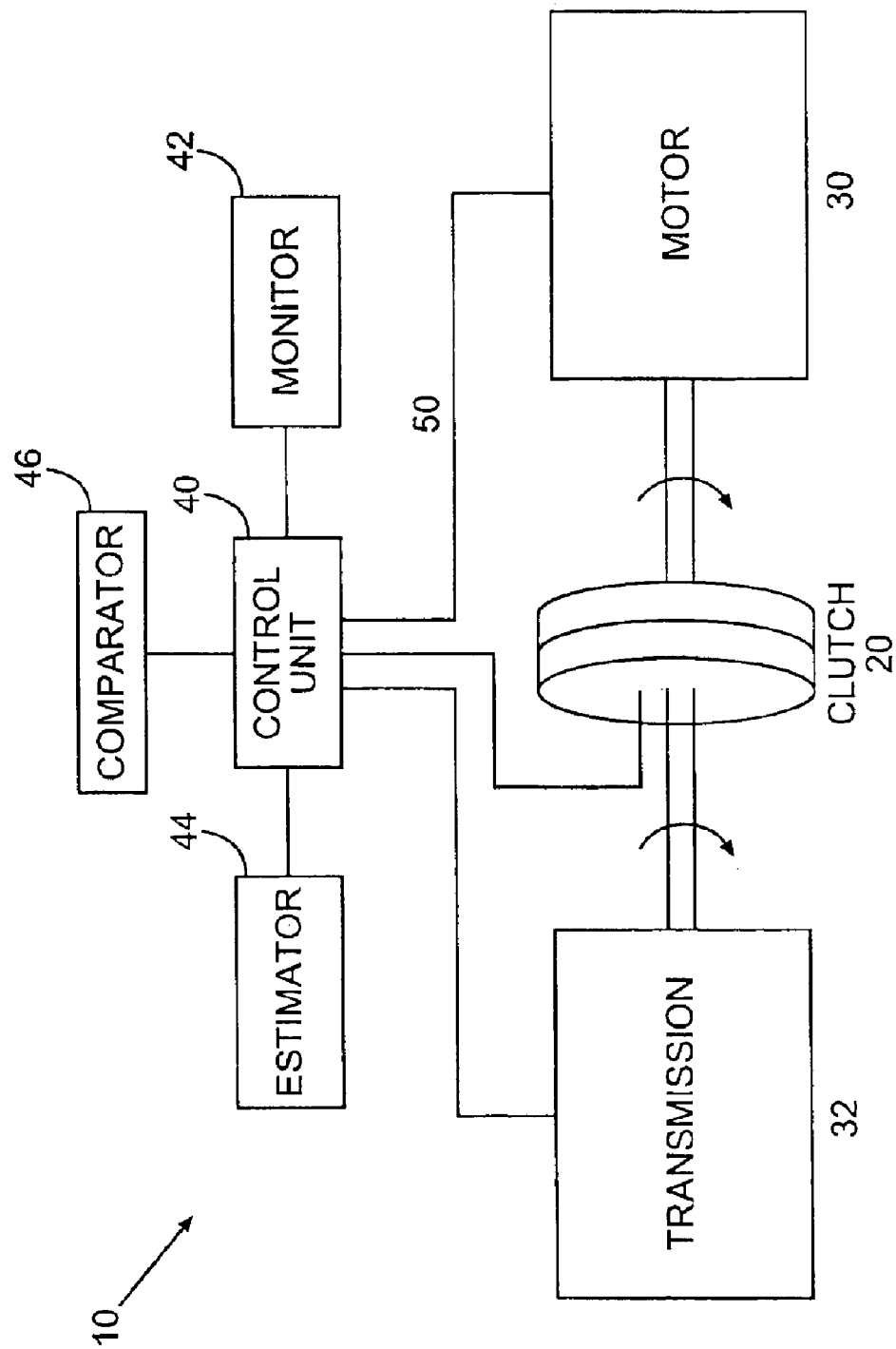
FIG. 1 is a simplified illustration of a clutch protection system according to one embodiment of the present invention.

FIG. 1 depicts the vehicle clutch protection system 10 according to one embodiment of the present invention. A transmission 32, such as an automatic transmission, is selectively engaged to a motor 30 by means of clutch 20. Transmission 32 may be any type of transmission typically found in a vehicle, for example, the Autoshift™ system made by Eaton Corporation. Additionally, transmission 32 may have the capability to be placed in a manual operating mode, thereby allowing the operator of a vehicle to determine when transmission 32 will actually shift to another gear. Motor 30 can be any type of motor used to propel a vehicle. Typically this will be an internal combustion engine, although other types of motors, such as an electric motor, may just as easily be used with the present invention. In the illustrated embodiment, clutch 20 is a wet clutch, which typically relies on oil not only as a lubricant but also as a coolant. Of course, the clutch protection system can be adapted to work with different types of clutches. A microprocessor-based control unit 40 is connected via data links 50 to motor 30, transmission 32 and clutch 20. Data links 50 may be comprised of a variety of types of data communication methods. One example of a data link 50, provided for illustrative purposes, is the J1939 link used for communication of data, such as current motor speed and torque, between a motor and a transmission system. Additionally, although only one control unit 40 is shown in FIG. 1, the invention is not limited to this. For example, the system may be designed to include two controllers, such as one in the interior of a vehicle allowing for operator input, while the second is located with the transmission system for control over clutch functions.

In simple terms, the clutch protection system assess whether a vehicle clutch may be subject to possible damage, due to excessive slipping of the clutch, by calculating an estimated amount of energy dissipated by the clutch, and comparing this estimated amount of energy to one or more predetermined thresholds. Once one of these thresholds is surpassed by the estimated amount of energy being dissipated by the clutch, the system initiates one or more actions designed to place the clutch back into a safe operating state.

The detailed operation of the clutch protection system according to one embodiment of the present invention will now be discussed. Based on various operating parameters, control unit 40 is able to calculate an estimated amount of energy being dissipated by clutch 20. For illustrative purposes, consider the following equations, which provide one example of how to calculate an estimated amount of energy dissipated by clutch 20 for every period of time delta T, such as, for example, every 10 milliseconds.

Clutch Power=abs(Motor Speed−Input Shaft Speed)*net motor torque/7426

Clutch Energy=Clutch Energy+(delta T*Clutch Power)−(Cooling Rate*Previous Clutch Energy)

Where:

Speed unit is rpm

Torque unit is lb-ft

Clutch Power unit is BTU/sec

Clutch Energy unit is BTU

Cooling Rate=Predetermined rate at which clutch transfers energy to its surroundings 7426=Constant based on the above units Initially, clutch power=0 and clutch energy is set at a predetermined default value. Subsequently, control unit 40 repeatedly calculates an estimated clutch energy, for example, every 10 milliseconds, and updates the previous values based on the most recent calculations.

The system continues to calculate and revise the estimated amount of energy dissipated by the clutch as long as the clutch is in a state that allows for excessive slippage, thereby leading to premature wear and possible damage to the clutch. This excessive slippage of the clutch is characteristic of both an i) urge to move state, and an ii) engage to lockup state. Except for transient conditions, the clutch at all other times should be in either a fully engaged or fully disengaged state, thereby precluding possible damage due to excessive slippage.

To illustrate an urge to move state, consider the following example. A driver stops his or her vehicle, engages the parking brake, and then exits while leaving the motor running. However, the driver forgets to place the transmission into neutral, thereby disengaging the clutch from the engine. As such, the running motor 30 is constantly urging the vehicle to move forward by transferring its energy through clutch 20 and the gears of transmission system 32, to ultimately cause the tires to rotate. However, as the parking brake is engaged, the tires are prevented from rolling. This prevents the gears of transmission system 32 from rotating. As a result, clutch 20 is placed in a constant state of slipping, leading to excessive wear and damage.

Similarly, clutch 20 is subject to excessive slipping when placed in a typical engage to lockup state. For example, consider an operator of a truck that is carrying a heavy load and is stopped on a steep incline. However, instead of using the brakes, the driver prevents the truck from rolling back down the hill by engaging the clutch 20 and throttling the engine 30 just enough to prevent the truck from moving. This places the clutch 20 in a constant state of slipping as it continuously attempts to engage and lockup with the engine 30.

Figure 2:
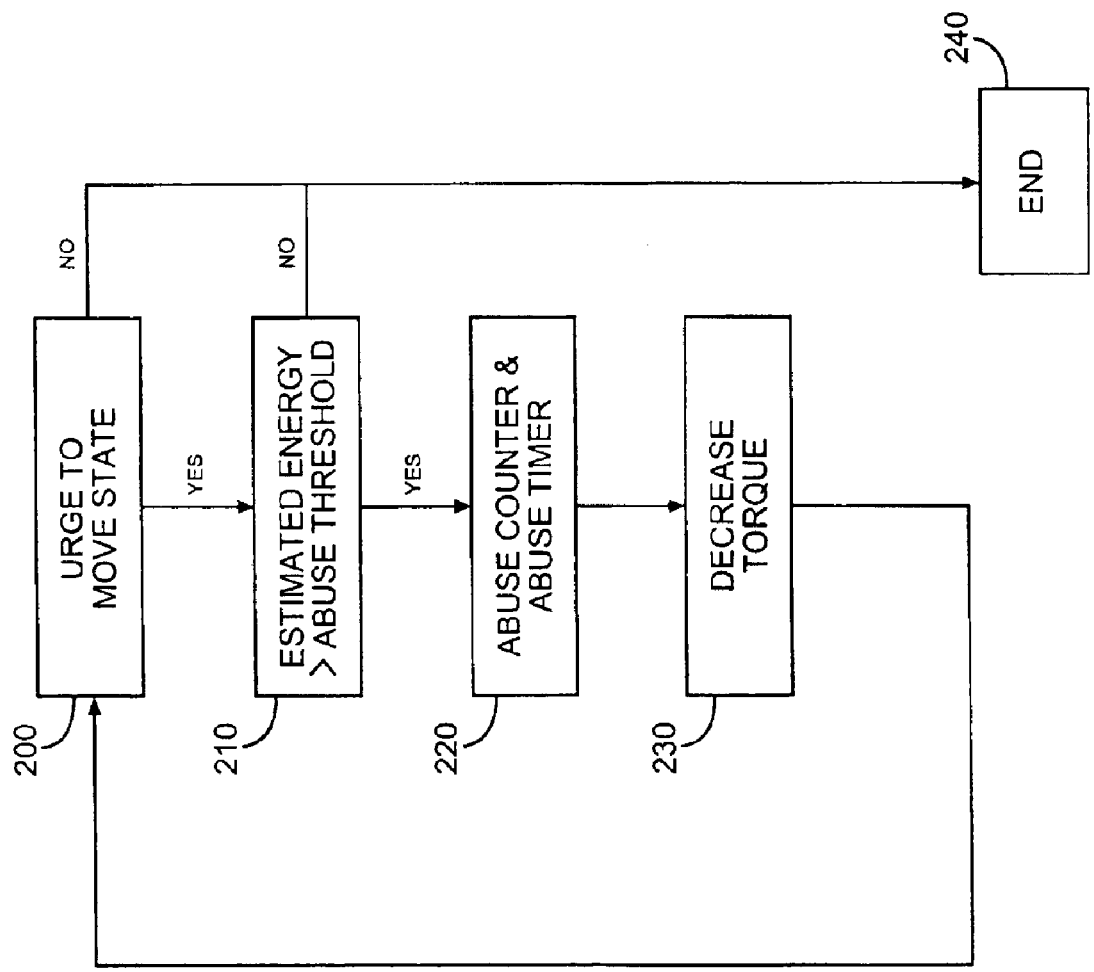
FIG. 2 is a simplified flow chart depicting the basic steps taken by the clutch protection system according to one embodiment while the clutch is in an urge to move state.

According to the present embodiment, vehicle clutch 20 is protected from residing in an urge to move state for to long, thereby minimizing the exposure of clutch 20 to a potentially damaging operating state, by comparing the estimated amount of energy dissipated by clutch 20 to a clutch abuse threshold. FIG. 2 depicts a simple flow chart of the steps taken by clutch protection system 10 of the current embodiment. First, a monitor 42, typically associated as a component of a control unit 40 with appropriate input being received from the necessary components by way of data link 50, determines whether clutch 20 is in an urge to move state 200. The system then uses an estimator 44, also typically part of control unit 40, to estimate the amount of energy being dissipated by clutch 20. A comparator 46, also typically part of control unit 40, then determines whether the estimated amount of energy being dissipated by clutch 20 is above a predetermined abuse threshold level 210, indicating that there is potential for damage to the clutch 20. If the estimated amount of energy is not above the threshold level, the system ends its current line of inquiry and returns to the beginning of the routine. However, if the estimated amount of clutch energy exceeds the clutch abuse threshold 210, the protection system 10 will begin to decrease the amount of "urge to move" torque 230 generated by motor 30 and applied to clutch 20. According to the present embodiment, this decrease in torque is carried out at a constant rate, such as, for example, 15 lb-ft/sec, although other constant rates, or even variable rates, could also be readily used. This decrease in torque continues until the estimated clutch energy dissipated by clutch 20 no longer exceeds the clutch abuse threshold level 210.

Additionally, once the estimated amount of clutch energy initially exceeds the predetermined clutch abuse threshold at step 210, an optional clutch abuse counter (not shown in FIG. 1) may be incremented by one in order to keep track of the number of times this situation occurs. An abuse timer (also not shown in FIG. 1) may also be activated at step 220, allowing the clutch protection system 10 to keep track of the amount of time clutch 20 resides in the potentially harmful urge to move state.

Figure 3:
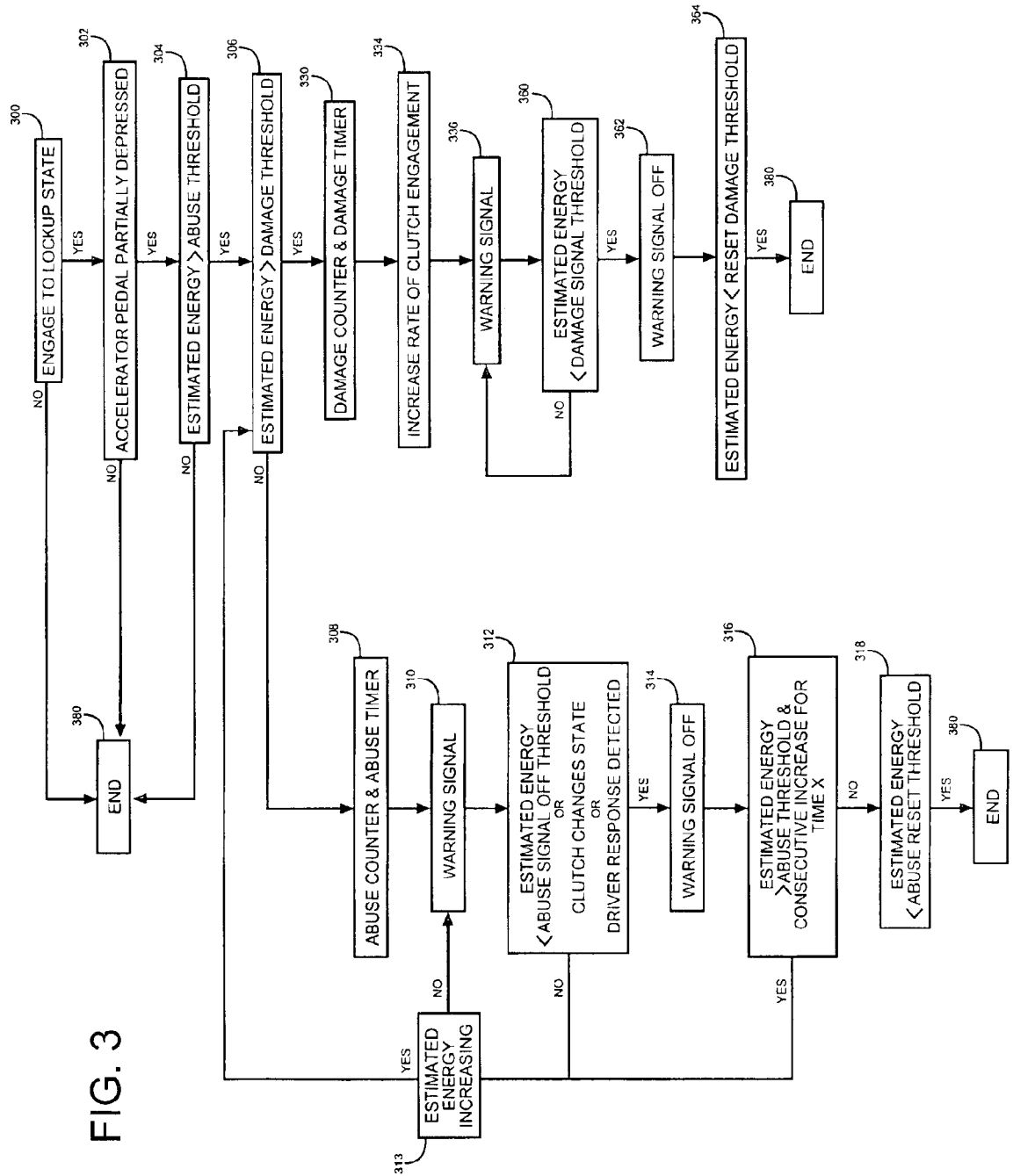
FIG. 3 is a simplified flow chart depicting the basic steps taken by the clutch protection system according to one embodiment while the clutch is in an engage to lockup state.

FIG. 3 depicts a simple flow chart depicting the steps taken by clutch protection system 10 according to a first embodiment that deals with a vehicle whose clutch is in an engage to lockup state. Unlike the analysis performed during the urge to move state, both a clutch abuse threshold and clutch damage threshold are utilized in the process of determining what actions, if any, need to be taken to protect clutch 20 from damage. In accordance with the present embodiment, the clutch abuse threshold is lower in value than the clutch damage threshold, both of which are predetermined based on the specific type of clutch installed in the vehicle.

Monitor 42 first determines whether clutch 20 is in an engage to lockup state at step 300. In addition, monitor 42 determines whether the acceleration pedal of the vehicle is at least partially depressed (step 302), indicating that the driver of the vehicle is currently seeking to obtain more power from motor 30 beyond that produced when in a basic idle state. If these two requirements are satisfied, comparator 46 then determines whether the estimated amount of energy dissipated by clutch 20 exceeds a predetermined clutch abuse threshold (step 304). If any of the above steps result in a negative answer, the current inquiry process is ended and allowed to start all over. If it is determined that the estimated amount of energy dissipated by clutch 20 does exceed the clutch abuse threshold (step 304), it must be determined whether the clutch damage threshold is also exceeded (step 306).

Assuming that the estimated amount of clutch energy exceeds the clutch abuse threshold, but not the higher clutch damage threshold, the inquiry process continues on with step 308. There an abuse counter is incremented, allowing the system to keep track of the number of times the clutch 20 has been placed in a potentially damaging state. The system also records, by means of a timer (not shown in FIG. 1), a relative abuse time stamp for the current event, and also accumulates the amount of time the clutch spends exceeding the clutch abuse threshold but below the clutch damage threshold. A warning signal is also issued at step 310. The warning signal is directed to the operator of the vehicle, and is intended to alert the operator to the fact that he or she is abusing the clutch 20. The warning signal can be either visual, auditory, or both. One example of a warning signal, provided for illustrative purposes, is the sounding of a continuous 1 second alert followed by 1 second of silence. Furthermore, a display on the vehicle dashboard can, for example, flash a letter "C" followed by the letter "A" to indicate that a clutch abuse state is currently present.

The system 10 will continue to issue the warning signal until one of three possible conditions occurs (step 312). First, the warning signal will subside if the estimated clutch energy level falls below a clutch abuse signal-off threshold. This threshold can be defined in numerous ways. For instance, the signal-off threshold can simply be made equal to the clutch abuse threshold. However, this can result in repeated warning signals if the average amount of energy dissipated by clutch 20 is close to the energy level that represents the clutch abuse threshold. Expected fluctuations in the clutch energy level can lead to a frequent and repeated triggering and silencing of the warning signal as the clutch energy level repeatedly exceeds the threshold by a brief amount as the energy level routinely fluctuates. To rectify this condition, the signal-off threshold level can be set at a lower level than that of the clutch abuse threshold. Accordingly, the warning signal will issue once the clutch energy level exceeds the abuse threshold, and it will not subside until the clutch energy level drops below the abuse threshold by a predetermined amount. Once subsided, the warning signal will not issue again until the clutch energy level rises enough to once again exceed the clutch abuse threshold.

The second condition that will turn off the warning signal is a change in state of clutch 20. For example, if the vehicle operator increases the speed of the motor, thereby increasing the amount of torque applied to the clutch, or alternatively, the transmission system 32 triggers a shift in gears.

The third condition that will terminate the clutch abuse warning signal is if the system, by means of control unit 40, senses that the vehicle operator has made a conscious effort to stop abusing the clutch 20. Various criteria can be used to define this condition, for example, the control unit 40 detecting a consecutive decrease in estimated clutch energy for a minimum duration of time, such as, for illustrative purposes, 100 milliseconds.

If none of the above three conditions represented by step 312 are satisfied, the warning signal will continue to be issued. Furthermore, the system also checks on whether there has been an increase in the amount of estimated energy dissipated by the clutch (step 313). If there has been an increase in the amount of estimated energy, the system returns to step 306 to determine whether the amount of estimated energy now exceeds the clutch damage threshold.

If any of the above three conditions represented by step 312 are satisfied, the warning signal is turned off at step 314. However, the clutch protection system 10 does not reset itself yet. Instead, the estimated amount of energy dissipated by clutch 20 is once again calculated and compared to the clutch abuse threshold at step 316. If the estimated clutch energy level exceeds the abuse threshold level, and continues to consecutively increase for a predetermined duration of time, the process will return to step 310 and the warning signal will once again be issued. Alternatively, if the estimated clutch energy level decreases below a clutch abuse reset threshold (step 318), for example, a predetermined amount below the clutch abuse threshold, the inquiry process is ended and the system resets.

If it is determined that clutch 20 is in an engage to lockup state (step 300), that the acceleration pedal is at least partially depressed (step 302), and the estimated clutch energy level exceeds not only the clutch abuse threshold (step 304), but also exceeds the higher clutch damage threshold (step 306), the system continues on to step 330. Note that steps 304 and 306 could be exchanged with one another, such that the system determines whether an estimated amount of energy dissipated by clutch 20 exceeds the clutch damage threshold first before determining whether the clutch abuse threshold is exceeded. Similar to step 308, step 330 involves the incrementing of a clutch damage counter and the generation of a relative damage time stamp that allows the system to determine how much time clutch 20 is subject to damage.

At this point, it can be determined that the clutch 20 is in a typical engage to lockup state, such as when an operator has stopped his or her truck on an incline and is using the clutch instead of the brakes to keep the truck from rolling backwards. In this instance, the control unit 40 attempts to cause clutch 20 to fully engage the motor 30, thereby preventing any more damage caused by excess slipping of the clutch 20. This is accomplished by increasing the rate at which clutch 20 engages motor 30 (step 334). As the rate of clutch engagement increases, the chance of clutch damage due to slippage decreases. The end result is the full engagement of clutch 20, leading the truck or vehicle to begin to accelerate.

According to a further embodiment, the increased rate of clutch engagement is not a constant, but instead variable depending on how much energy is being dissipated by clutch 20. The greater the amount of energy in clutch 20, the farther the clutch damage threshold is exceeded, resulting in an increased rate of damage to clutch 20. Accordingly, it would seem preferable to have clutch 20 fully engage the motor 30 as fast as possible, thereby minimizing the amount of time that clutch 20 is excessively slipping and subject to damage. However, in contrast, one would also prefer to have clutch 20 slowly engage motor 30, thereby providing more time for the operator of the vehicle or truck to react to the fact that their vehicle is beginning to accelerate.

To best satisfy both of the above requirements, the system is designed so that the farther an estimated clutch energy exceeds the predetermined clutch damage threshold level, the faster the rate of clutch engagement. Accordingly, if a clutch energy level only mildly exceeds the clutch damage threshold, the rate of clutch engagement will increase modestly. In contrast, if the clutch energy level significantly exceeds the clutch damage threshold, rate of clutch engagement will be increased significantly as well.

While the system is increasing the rate of clutch engagement in order to prevent any further damage to the clutch 20 due to slippage, the control unit also initiates a warning signal to the vehicle operator (step 336) to alert them to the fact that the clutch is in the process of fully engaging motor 30. Similar to before, the warning signal can be any type of auditory warning, visual warning, or combination thereof, as long as it alerts the vehicle operator to the clutch engagement and provides them with time to react properly.

The warning signal continues to sound and/or display until the estimated energy being dissipated by clutch 20 drops below a damage signal-off threshold, which is set at a predetermined amount below the clutch damage threshold. If the clutch energy level does drop below this damage signal-off threshold, the warning signal ceases, as indicated in step 362.

Similar to the abuse reset threshold of step 318, a damage reset threshold is employed at step 364, keeping the current process active until the estimated clutch energy level drops significantly enough to end the process (step 380) and reset the system.

In another embodiment of the invention, the vehicle employing the clutch protection system of the present invention may have a transmission system that allows an operator to place it in a manual mode of operation. Thus, instead of the transmission system 32 automatically shifting gears without input from the vehicle operator, the operator controls when a shift in gears is to occur. However, a disadvantage of this manual shifting-based system is that it allows for another unique situation where clutch 20 can be placed in a damaging operating state.

Some transmission systems 32 have the ability to be placed in a manual mode of operation where the vehicle operator determines when the transmission system 32 shifts between gears. However, in this mode, the vehicle can be driven in a manner as to place clutch 20 in another type of engage to lockup state. In this situation, however, instead of an operator trying to hold a vehicle stationary on an incline by means of the clutch 20, the vehicle is moving. Consider the following example, provided for illustrative purposes. An operator has his or her vehicle currently in a high gear and is approaching a red light. The operator begins to slow the vehicle down without disengaging the clutch 20 or downshifting the transmission system 32. Due to the slow speed, clutch 20 begins to unlock or disengage. At this point in time, the light turns green and the operator begins to accelerate their vehicle, still without shifting to a lower gear. This causes the clutch to excessively slip. Unlike the previous engage to lockup situation, one doesn't want to engage the clutch while the transmission system 32 remains in a high gear as it can cause the motor 30 to stall. The clutch protection system according to the current embodiment solves the above problem by temporarily overriding the manual shift mode and causing the transmission system 32 to automatically shift to a lower gear.

Figure 4:
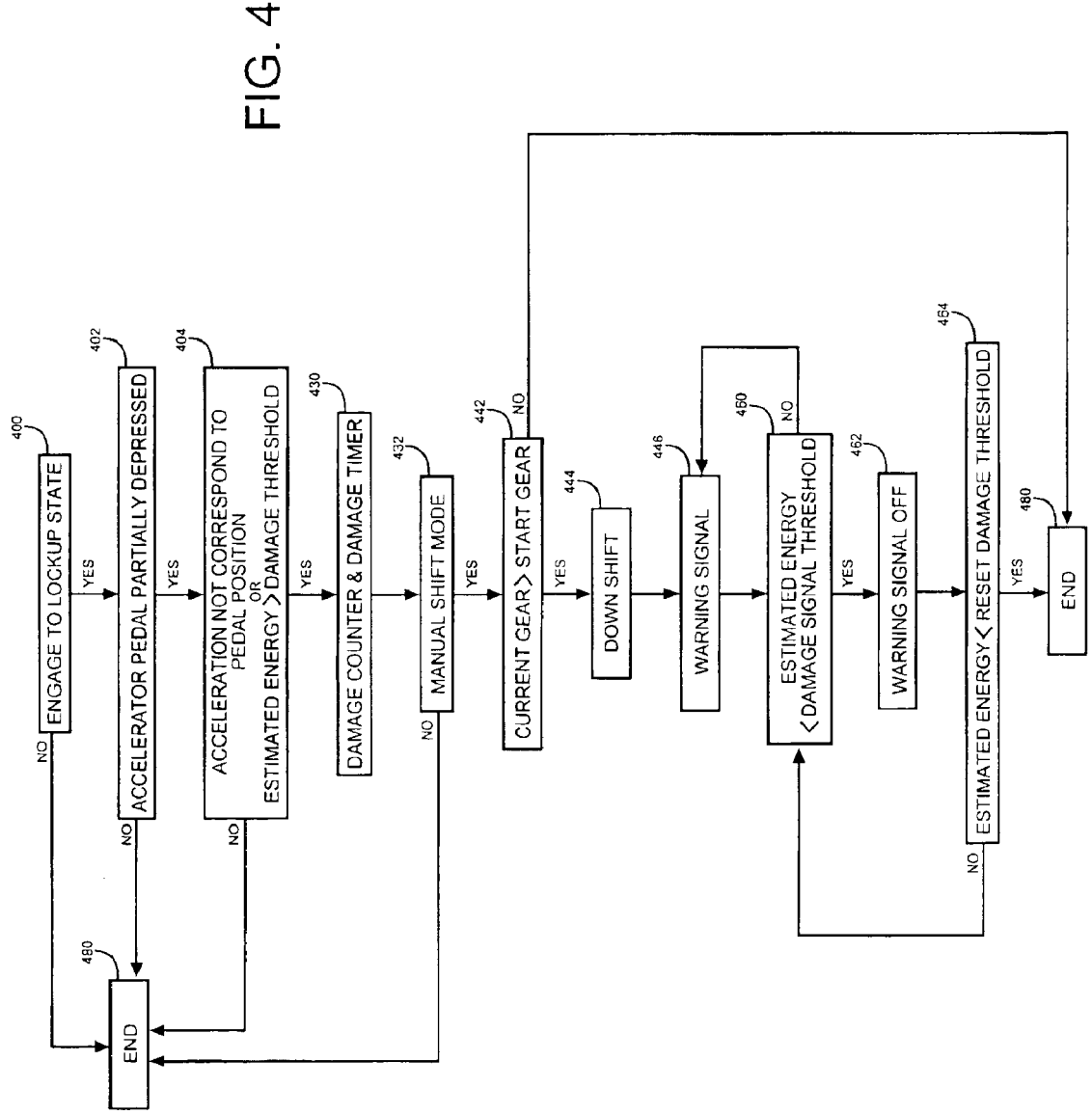
FIG. 4 is a simplified flow chart depicting the basic steps taken by the clutch protection system according to a second embodiment while the clutch is in an engage to lockup state.

As depicted in FIG. 4, if the clutch is in an engage to lockup state (step 400), and the accelerator pedal of the vehicle is at least partially depressed (step 402), the system then determines whether the acceleration of the vehicle corresponds to the amount of acceleration that should correspond to the current position of the depressed accelerator pedal (step 404). Additionally, the system also checks to see if the amount of estimated energy dissipated by the clutch exceeds the clutch damage threshold (step 404). If the vehicles actual acceleration does not correspond to the acceleration expected, or if the estimated clutch energy does exceed the clutch damage threshold, the system increments a counter and generates a time stamp (step 430) as done in previous embodiments. It must also check to confirm that the transmission system 32 has been placed in a manual operating mode (step 432). Upon confirmation of this condition, the control unit 40 determines whether the current gear the vehicle is in is the gear used to start the vehicle (step 442). This check is necessary to assure that a lower gear is available to shift down into. Assuming that the vehicle is not in one of the lower starting gears, the control unit 40 causes the transmission system 32 to down shift. At the same time, a warning signal similar to that of step 336 is initiated. Steps 460–480 are then repeated in the same fashion as they were carried out in the engage to lockup situation involving a transmission system 32 not placed into a manual operating mode.

Figure 5:
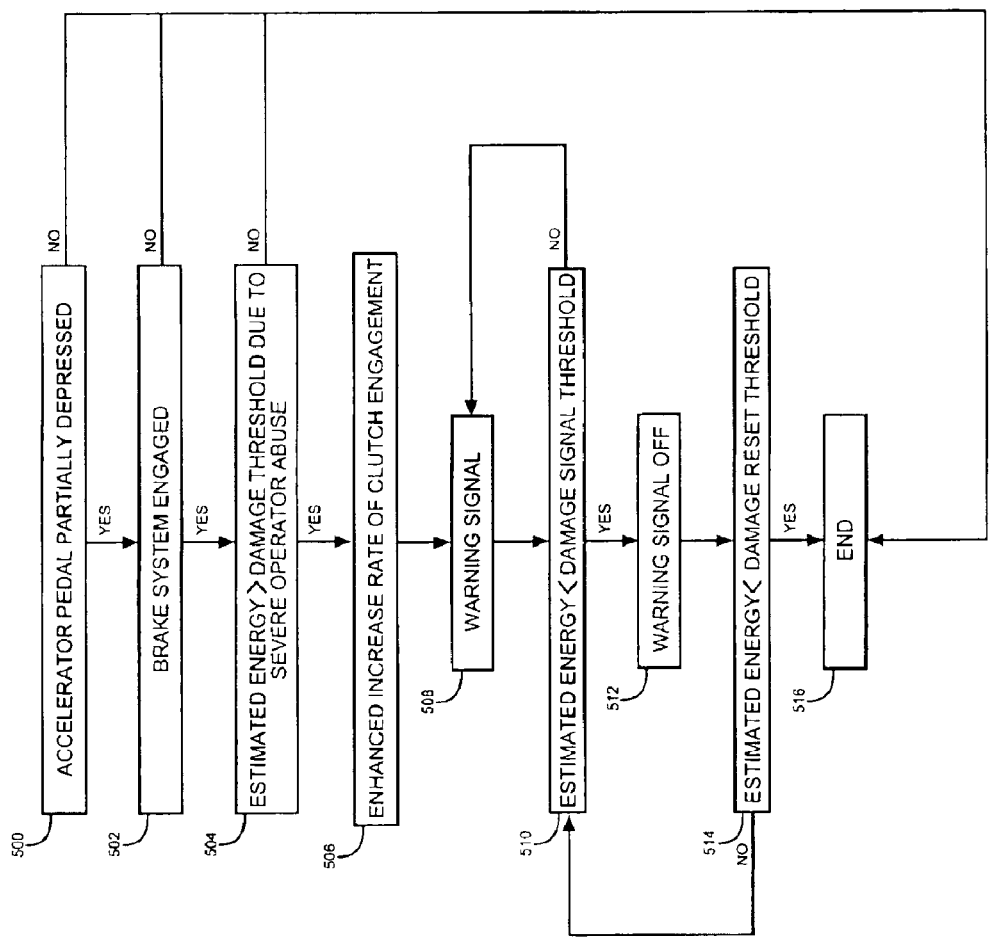
FIG. 5 is a simplified flow chart depicting the basic steps taken by the clutch protection system according to one embodiment while the clutch is under severe abuse by an operator.

According to another embodiment of the present invention, the clutch protection system 10 will attempt to prevent damage to clutch 20 caused by a vehicle operator severely abusing the clutch 20. As depicted in the flow chart of FIG. 5, this mode of operation requires three conditions. First, the clutch protection system 10, by means of the control unit 40, must detect the accelerator pedal being at least partially depressed (step 500), indicating that the vehicle operator is seeking increased power from motor 30. Additionally, it must also determine that a braking system of the vehicle, such as, for example, the service brakes or parking brakes, are currently engaged (step 502), indicating that the operator is accelerating and braking the vehicle at the same time. Upon meeting these two conditions, the system assesses whether the estimated amount of energy dissipated by clutch 20 exceeds the clutch damage threshold. The system then proceeds to increase the rate of clutch engagement just as it did in step 334 of FIG. 3, except in this embodiment, an additional predetermined amount, for example, 30 lb-ft/sec, is added upon to the prior amount that the rate of clutch engagement was increased by in the prior embodiment. Thus, if the rate of clutch engagement was increased by 20 lb-ft/sec at step 334, the rate of clutch engagement in this embodiment would be increased by 50 lb-ft/sec. All further steps depicted in FIG. 5 are the same as those that follow step 334 of FIG. 3, and will not be discussed in any further detail.

In a further embodiment of the Applicant's invention, the clutch protection system 10 is designed to provide limited functions in the event of a data link failure. For example, if the J1939 data link between the control unit 40 and motor 30 were to fail, the system will continue to estimate the amount of energy dissipated by the clutch 20, initiate warning signals when appropriate, and record abuse/damage information provided by the appropriate counters and timers. However, as the clutch protection system 10 can no longer deliver control data to motor 30, activities such as decreasing the amount of torque applied to clutch 20 will any longer be capable.

In many of the embodiments disclosed above, the clutch protection system issues a warning signal as one type of action designed to reduce the amount of energy dissipated by clutch 20. It was previously emphasized that these warning signals (i.e. steps 314, 336, 446 and 508) can be either auditory, visual, or a combination thereof. Furthermore, these warning signals can all be of the same type of alert, or, if desired, they can be different so as to be distinguishable from one another. For example, it may be desirable to have the warning signal (step 310) issued upon a clutch energy exceeding the clutch abuse threshold to be audibly or visually different than the warning signal (step 336) issued when the system is increasing the rate of clutch engagement.

While the invention has been specifically described in connection with certain specific embodiments thereof, it is to be understood that this is by way of illustration and not of limitation, and the scope of the appended claims should be construed as broadly as the prior art will permit.

What is claimed is:

1. A clutch protection system, comprising:
   a monitor for monitoring an operating state of a clutch connecting a motor to a system of gears;
   an estimator for estimating an amount of energy dissipated by said clutch;
   a comparator that compares said estimated amount of energy dissipated by said clutch to at least one predetermined threshold energy level; and
   a control unit wherein said control unit initiates one or more actions to automatically reduce said amount of energy dissipated by said clutch when said estimated amount of energy dissipated by said clutch exceeds said predetermined threshold energy level, wherein the greater said estimated amount of energy dissipated by said clutch exceeds said predetermined threshold energy level, the faster said control unit initiates one or more actions.

2. The clutch protection system according to claim 1, wherein said one or more actions initiated by said control unit comprise an issuance of a warning signal.

3. The clutch protection system according to claim 2, wherein said warning signal comprises a visual warning.

4. The clutch protection system according to claim 2, wherein said warning signal comprises an audible warning.

5. The clutch protection system according to claim 1, wherein said one or more actions initiated by said control unit comprise reducing an amount of torque transmitted through said clutch.

6. The clutch protection system according to claim 5, wherein said reduction in torque continues at a predetermined rate until said estimated amount of energy dissipated by said clutch falls below said predetermined threshold energy level.

7. The clutch protection system according to claim 1, wherein said one or more actions initiated by said control unit comprise increasing a rate of clutch engagement.

8. The clutch protection system according to claim 7, wherein an amount of said increase in rate of clutch engagement is dependent upon said estimated amount of energy dissipated by said clutch.

9. The clutch protection system according to claim 7, wherein said one or more actions initiated by said control unit further comprise an issuance of a warning signal.

10. The clutch protection system according to claim 1, wherein said one or more actions initiated by said control unit comprise automatically shifting from a higher gear to a lower gear within said system of gears.

11. The clutch protection system according to claim 10, wherein said shifting from said higher gear to said lower gear is prevented if said shifting would cause said motor to enter an over-speed condition.

12. The clutch protection system according to claim 1, further comprising a counter for recording how many times said estimated amount of energy dissipated by said clutch exceeds said predetermined threshold energy level.

13. The clutch protection system according to claim 1, wherein said control unit tracks an amount of time that said estimated amount of energy dissipated by said clutch exceeds said predetermined threshold energy level.

14. The clutch protection system according to claim 1, wherein said monitor, estimator and comparator comprise part of said control unit.

15. The clutch protection system according to claim 1, further comprising at least one datalink connecting said monitor to one or more sensors incorporated into said clutch.

16. A method of protecting a clutch mechanism connecting a motor to a gear system, comprising the steps of:
monitoring an operating state of said clutch mechanism;
estimating an amount of energy dissipated by said clutch mechanism;
determining when said estimated amount of energy dissipated by said clutch mechanism exceeds a predetermined threshold energy level; and
initiating one or more actions designed to automatically lower said estimated amount of energy dissipated by said clutch mechanism when it is determined that said estimated amount of energy dissipated by said clutch mechanism exceeds said predetermined threshold energy level, wherein the greater said estimated amount of energy dissipated by said clutch exceeds said predetermined threshold energy level, the faster said one or more actions are initiated.

17. The method according to claim 16, wherein said one or more actions include issuing a warning signal.

18. The method according to claim 16, wherein said one or more actions include decreasing an amount of torque applied to said clutch mechanism.

19. The method according to claim 18, wherein said torque is decreased at a predetermined rate until said estimated amount of energy dissipated by said clutch mechanism fails below said threshold energy level.

20. The method according to claim 16, wherein said one or more actions comprise increasing a rate of clutch engagement.

21. The method according to claim 16, wherein said one or more actions comprise automatically shifting from a higher gear to a lower gear within said gear system when said gear system is under manual control.

22. A system for protecting a clutch of an automobile against damage when said clutch is in an engaged to lockup state and an accelerator pedal is at least partially depressed, comprising:
a monitor for monitoring said clutch and a motor of said automobile;
an estimator for estimating an amount of energy dissipated by said clutch;
a comparator that compares said estimated amount of energy dissipated by said clutch to at least a first predetermined threshold energy level and a second predetermined threshold energy level; and
a control unit that i) issues a warning signal when said estimated amount of energy dissipated by said clutch exceeds said first predetermined threshold energy level, and ii) automatically increases a rate at which said clutch engages said motor when said estimated amount of energy dissipated by said clutch exceeds said second predetermined threshold energy level, wherein said increase of said rate of clutch engagement is determined by said estimated amount of energy dissipated by said clutch, with a greater amount of exceedence of the second predetermined threshold energy level by said clutch resulting in a greater rate of clutch engagement.

23. The system according to claim 22, wherein said warning signal continues to be issued until at least one of the following occurs:
a) said estimated amount of energy dissipated by said clutch decreases below said first predetermined threshold energy level by at least a predetermined amount;
b) said clutch is placed into a different operating state; and
c) said estimated amount of energy dissipated by said clutch decreases and continues to decrease for at least a predetermined amount of time.

24. The system according to claim 22, wherein the greater said estimated amount of energy dissipated by said clutch exceeds said second predetermined threshold energy level, the faster said rate in which said clutch engages said motor.

25. A system for protecting a clutch of an automobile against damage when said clutch is in an engage to lockup state, an accelerator pedal is at least partially depressed, and a transmission system of said automobile is in a manual mode of operation, comprising:
a monitor for monitoring said clutch and a motor of said automobile;
an estimator for estimating an amount of energy dissipated by said clutch;
a comparator that compares said estimated amount of energy dissipated by said clutch to at least a first predetermined threshold and a second predetermined threshold; and
a control unit that i) issues a warning signal when said estimated amount of energy dissipated by said clutch exceeds said first predetermined threshold level, and ii) automatically downshifts said transmission system to a lower gear when a) said estimated amount of energy dissipated by said clutch exceeds said second predetermined threshold and b) said downshifting will not result in said motor entering an over-speed condition.

26. The system according to claim 25, wherein said downshifting of said transmission system also occurs when a) an acceleration of an input shaft of said transmission system falls below a predetermined threshold for a predetermined amount of time, and b) said downshifting will not result in said engine entering an over-speed condition.

27. The system according to claim 25, wherein said warning signal continues to be issued until at least one of the following occurs:
   a) said estimated amount of energy dissipated by said clutch decreases below said first predetermined threshold level by at least a predetermined amount;
   b) said clutch is placed into a different operating state; and
   c) said estimated amount of energy dissipated by said clutch decreases and continues to decrease for at least a predetermined amount of time.

28. The system according to claim 25, wherein the greater said estimated amount of energy dissipated by said clutch exceeds said second predetermined threshold energy level, the faster said control unit downshifts said transmission system to a lower gear.

* * * * *